United States Patent [19]
Fiarkoski, Sr.

[11] Patent Number: 5,144,940
[45] Date of Patent: Sep. 8, 1992

[54] COMPOST WATER HEATER AND METHOD

[76] Inventor: John E. Fiarkoski, Sr., 3833 S. 24th St., Omaha, Nebr. 68107

[21] Appl. No.: 633,273

[22] Filed: Dec. 24, 1990

[51] Int. Cl.5 ............................................. F24J 2/42
[52] U.S. Cl. ................................. 126/427; 126/450; 126/437
[58] Field of Search ............... 126/427, 419, 450, 432, 126/417, 437, 185; 110/346; 435/313, 291, 813, 290, 801

[56]       References Cited

U.S. PATENT DOCUMENTS

| | | | |
|---|---|---|---|
| 2,080,780 | 5/1937 | Mars | 110/346 X |
| 3,572,665 | 3/1971 | Vincent | 110/185 |
| 4,233,961 | 11/1980 | Kelly | 126/430 X |
| 4,306,544 | 12/1981 | Clemens | 126/437 |
| 4,455,374 | 6/1984 | Schwartz | 126/417 X |
| 4,984,561 | 1/1991 | Warrington | 126/417 |

Primary Examiner—Larry Jones
Attorney, Agent, or Firm—John A. Beehner

[57]       ABSTRACT

A compost water heater includes a digester housing adapted to be filled with layers of fresh organic matter. A water tank within the housing is heated by the natural composting of the fresh organic matter. Water lines are provided for filling and drawing water from the tank. The digester includes a force air supply system for dispersing air throughout the fresh organic matter. Water may be prewarmed to ground temperature in a first fill tank buried below the digester housing. Water from the first fill tank may be further prewarmed by a solar heated water tank, likewise buried below the digester housing.

14 Claims, 5 Drawing Sheets

COMPOST WATER HEATER AND METHOD

BACKGROUND OF THE INVENTION

The present invention is directed generally to a compost water heater and more particularly to an apparatus in which organic material is composted to heat water contained within a tank in the apparatus. A solar heater may be incorporated for preheating water that is input into the compost heated water tank.

In view of the high cost of fuel and in the interest of conserving on nonrenewable energy resources, a goal of this invention is to heat water by compost generated heat without negative effect on the environment. Heat generated by a composting process is advantageous in that the process works twenty-four (24) hours a day and in all types of weather conditions, as opposed a purely solar heat generation process wherein solar heat is available for only a few hours a day and only on sunny days.

An investigation of prior art revealed little use of compost generated heat. A farmer attempted an experiment in the 1970, but it was a complete failure since he tried to take high or directly from the compost pile and, as a result, produce unacceptable odors in the house. Another idea surfaced from a West German whereby the compost heat was to be used to heat water in a heat pump situation.

Many years of experience with solar energy has indicated that solar energy by itself is not the answer to our energy woes, as was proposed back in the late 1970's. There is not enough solar heat gain available in the winter months when the biggest need for heat exists. Furthermore, the cost of solar equipment is to high to justify its use.

Furthermore, in view of the substantial dependence of the United States on foreign oil, there is a substantial need for an alternative to non-renewable energy.

Accordingly, a primary object of the invention is to provide an apparatus and method for harnessing and using heat extracted from lawn and garden weight and other organic material as it decomposes.

Another object is to provide such an apparatus and method which operates to generate heat over an extended period of time.

Another object is to provide such an apparatus and method wherein heat generation within the device results both from composting and solar collection.

Another object is to provide an energy producing resource available for individual homeowners and for remote sites wherein public power is unavailable.

Another object is to provide an apparatus and method for heating water by composting which requires relatively little maintenance and attention.

Another object is to provide a compost water heater which is simple and rugged in construction, inexpensive to manufacture and efficient in operation.

SUMMARY OF THE INVENTION

The compost water heater of the present invention includes a digester housing adapted to be filled with layers of fresh organic matter, a water receptacle in the housing including means for filling the receptacle with water and drawing heated water from the receptacle. An air supply system is arranged within the digester housing and is operative to disperse air at spaced apart positions throughout the digester. The air supply system is connected to a supply of forced air whereby, upon filling the digester housing with fresh moisture organic matter at least to a level to substantially cover the water receptacle and upon filling the receptacle with water and connecting the air supply system to a source of forced air, organic matter and the digester is composted, producing heat which warms the water in the compost heated water receptacle.

Glazing may be included in at least the top wall of the housing to take advantage of solar energy for warming the organic matter in the housing. To compliment compost generated heat, a solar heating system may be used in conjunction with the housing, which system includes a solar collector and a heat exchanger arranged in heat exchange relation with a solar heated water tank for prewarming the water before its introduction into the compost heated water tank in the digester housing. Further prewarming of the water before it is introduced into the solar heated water tank may be effected by providing a first fill tank buried in the ground adjacent the digester housing for warming incoming water to ground temperature before it is advanced to the solar heated water tank.

The air supply system of the invention preferably includes a plurality of air supply tubes extended throughout the digester housing for dispersing air at various positions therein, thereby to prevent the composting process from becoming anaerobic and producing undesirable odors.

By combining the sun's energy with decaying vegetation, it is possible to supply seventy-five percent (75%) of our water heating needs. This heated water can then be used to heat buildings, as well as to supply warm water to a household. The compost water heater of the invention may be used during winter months to recycle lawn and garden waste into a very useable by-product, namely humus and may alternately be used in the early spring as a hot bed for starting seedlings.

BRIEF DESCRIPTION OF THE DRAWINGS

FIG. 2 is a partially exploded perspective view of the compost water heater of the invention;

DESCRIPTION OF THE PREFERRED EMBODIMENT

Figure 1:
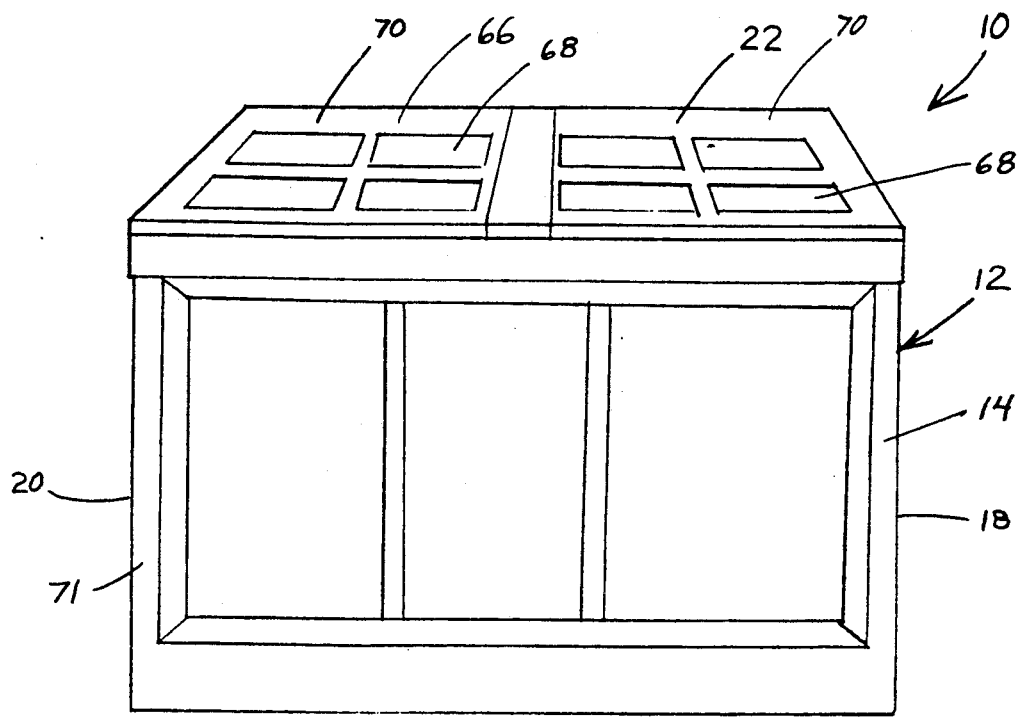
Figure 6:
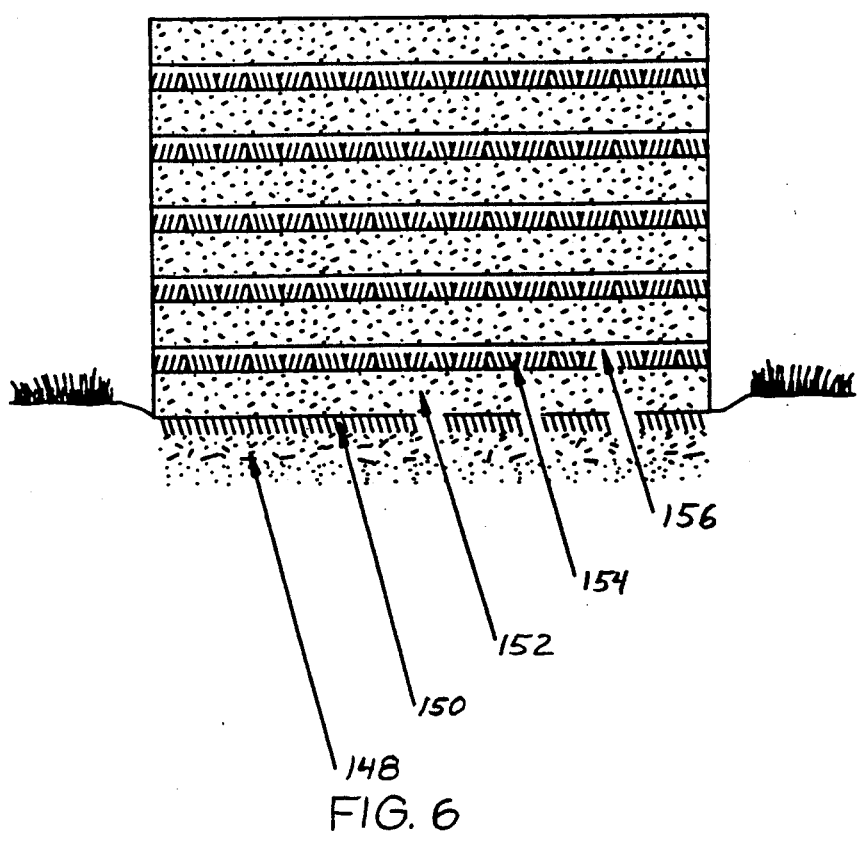
FIG. 6 is a partially sectional elevational view of the organic material within the digester housing.

The compost water heater 10 of the present invention includes a digester housing 12 having opposite front and back walls 24 and 16, opposite side walls 18 and 20 and a top wall 22. The digester housing is adapted to be filled with moist organic matter which through a natural composting process, produces substantial heat for warming water in a compost heated tank 24, preferably supported at a central position within the digester housing where the compost generated heat is greatest.

Figure 2:
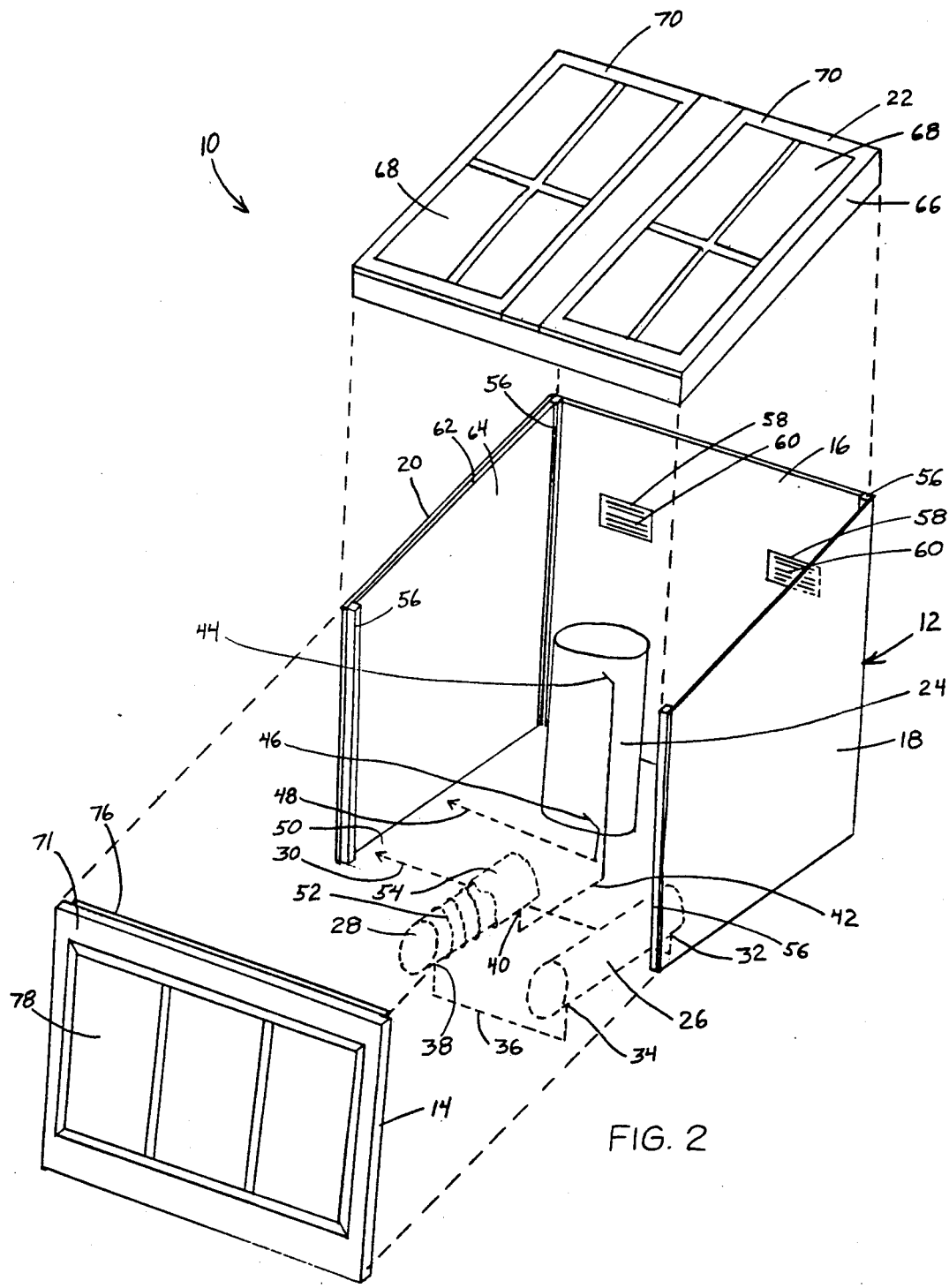
FIG. 2 is a perspective view of the digester housing of the invention.

As shown in FIG. 2, a first fill tank 26 and a solar heated water tank 28 are buried in the ground beneath the digester housing 12 for prewarming of water before it is introduced into the compost heated tank 24. A water supply pipe 30 is connected to a source of water, such as a city water line for directing water into the inlet 32 of first fill tank 26. The temperature of the water in first fill tank 26 is tempered by the ground temperature prior to discharge through outlet 34 for passage through pipe 36 to inlet 38 of the solar heated water tank 28. The water therein is further warmed by solar energy as described hereinbelow whereupon the further warmed water is discharged through outlet 40 and pipe 42 to the inlet 44 of the compost heated tank 24. That tank is situated in direct heat exchange relation with the surrounding compost material whereupon the water in tank 24 is substantially heated and available for discharge through outlet 46 and pipe 48 for use in an adjacent house or business establishment.

Referring to FIG. 2, construction of the compost water heater 10 begins by digging a hole 50 in the ground to accommodate placement of the first fill tank 26 and solar heated water tank 28 beneath the digester 12. These tanks may be of the type used in residential hot water heaters. Both tanks are arranged horizontally and are outfitted with the plumbing pipes illustrated in FIG. 2 for water communication to and between the tanks. As further explained herein below, the solar heated water tank 28 is preferably wrapped with one half (½) to three quarter inch (¾") copper tubing, approximately thirty feet (30') in length, as the heat exchanger 52 for the solar heater. The heat exchanger 52 should be coiled around the tank 28 as tightly as possible for direct thermal conduction between the two. The tank 28 and heat exchanger 52 are preferably insulated with blanket insulation 54 to reduce heat loss to the ground.

The digester housing 12 is easily constructed by forming the back wall 16 and side walls 18 and 20 of three quarter inch (¾") treated plywood and inner connecting the boards with four corner posts 56 which may be 2×2 lumber. The illustrated housing is eight feet (8') side to side, five feet eight inches (5'8") front to back, six feet high at the front and eight feet high at the back. Back wall 16, which is intended to face north, is provided with two vent openings 58, approximately six inches by twelve inches (6"×12") with air vents 60 fitted therein. Air vents of the type used in heating and air conditioning ducts work very well since they offer a manual means of opening and closing the vent openings 58. These vents will allow gasses to escape in the early, hot stages of composting.

The interior surfaces of back wall 16 and both side walls 18 and 20 are lined with one inch (1") thick solid insulation 62, the interior surface of which is preferably covered with plastic sheeting 64 to protect it from soiling from the compost.

Top wall 22 is constructed of suitable framing 66 for supporting glazing 68 as in the window units 70 in the illustrated embodiment. The glass works very well by allowing the sun's heat to pass through and remain trapped inside the digester. It is important that the top wall 22 be sealed to the housing so that the sun's heat will provide warmth in the digester on extremely cold days. On days when the sun is not shining, the warmth of the compost is thus trapped in the digester.

The front wall 14 of housing 12 is preferably constructed of suitable framing 71 for supporting a solar collector 72 and sealing it at the front of the housing. Solar collector 72 is constructed as a large shallow pan having stainless steel or aluminum backing 74 on the back and four sides with at least one inch (1") solid insulation 76 on the side facing the housing 12. The surface of backing 74 which faces the sun is painted black using a high temperature resistant paint. The front of the solar collector is closed with glazing 78. The collector is equipped with interior piping 80 for absorbing solar energy and warming the fluid within piping 80.

Figure 3:
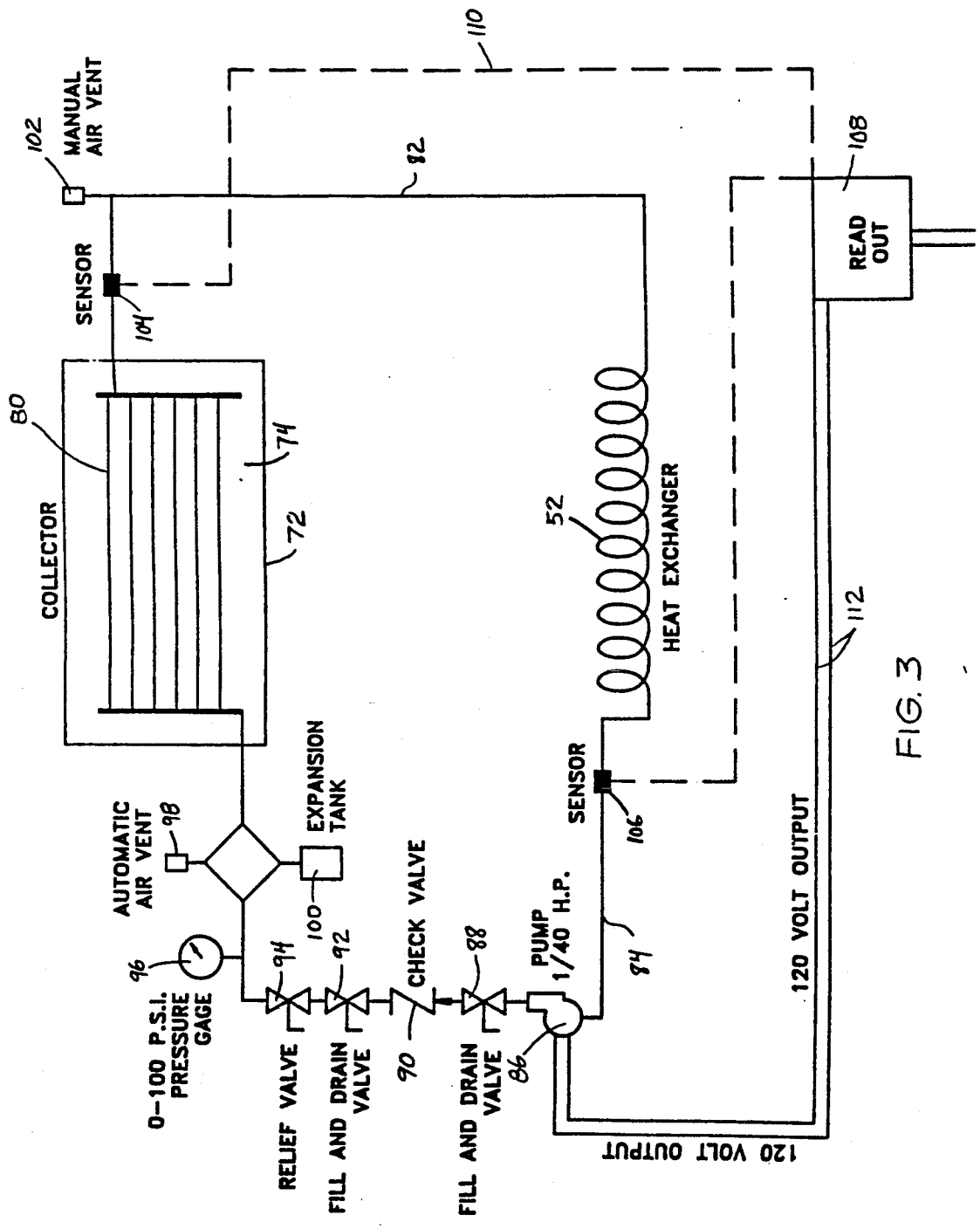
FIG. 3 is a schematic plumbing diagram for the compost water heater of the invention.

The solar heater of the invention is diagrammatically illustrated in FIG. 3. The piping 80 within solar collector 72 is connected by pipe 82 to the heat exchanger 52 which is connected by further piping 84 back to the collector 72. A 1/40th horsepower electric pump 86 is interposed along pipe 84 together with a fill in drain valve 88, check valve 90, fill in drain valve 92, relief valve 94, a 0–100 p.s.i. pressure gauge 96, together with an automatic air vent 98 and expansion tank 100. A manual air vent 102 may be interposed along pipe 82. A temperature sensor 104 is connected to pipe 82 adjacent the outlet from collector 72 and another sensor 106 is connected to piping 84 adjacent the outlet of heat exchanger 52, with both being connected to a control panel 108 equipped with a digital readout for the sensors 104 and 106. The control panel 108 is connected by wiring 110 to a source of electric power and by wiring 112 to the pump 86.

The solar heater is charged by filling this system with a 50/50 solution of antifreeze and water. A pump is needed to pressurized and leak test the installation. To pressurize the system, the pump inlet hose is placed in a bucket containing the water/antifreeze mixture and the outlet hose is connected to the upper solar fill valve 92. Valve 92 is opened and fluid is pumped into the system until the pressure reaches 20 p.s.i. Another hose is connected between the lower solar drain valve 88 and the bucket of antifreeze/water mixture. This will allow air bubbles to be released from the system. As the air bubbles subside, slowly close the valve 88. Should the system bleed down, the process may need to be repeated.

Figure 4:
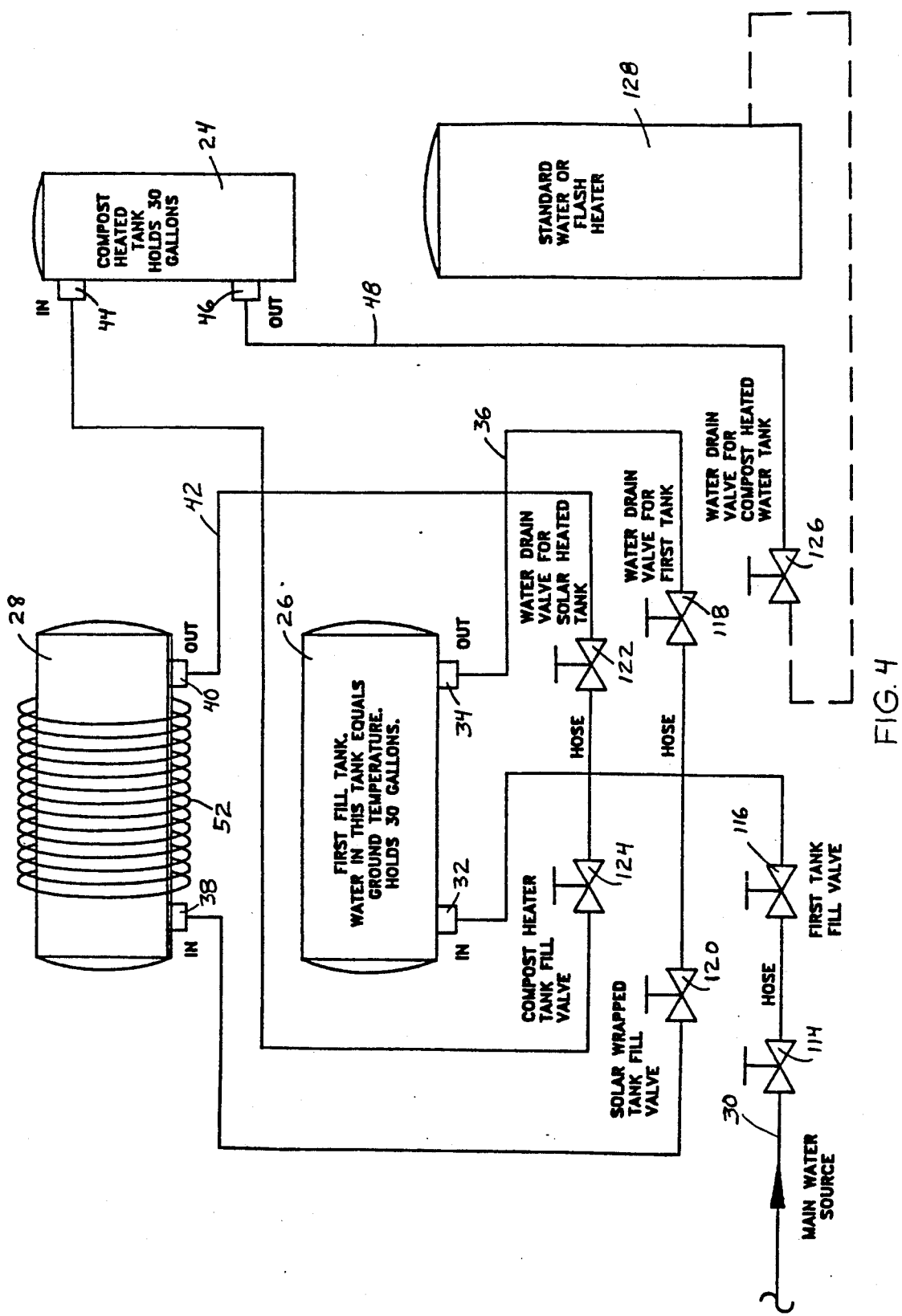
FIG. 4 is a schematic diagram of the solar heater portion of the invention.

FIG. 4 is a schematic diagram of the plumbing network of the invention. The general flow of water through the system has been described above. FIG. 4, however, discloses additional hardware including the main water valve 114 and first tank filled valve 116 on pipe 30. On pipe 36 from the first fill tank outlet 34, there is mounted a water drain valve 118 for the first tank 26 and a fill valve 120 for the solar heated water tank 28. Along pipe 42 leading from the solar heated water tank, there is mounted a water drain valve 122 for the solar heated tank 28 and a fill valve 124 for the compost heated tank 24. Pipe 48 leading from the compost heated tank 24 has a water drain valve 126 interposed therealong for regulating the flow of water to a standard water or flash heater 128 situated remote from the compost heater 10.

Figure 5:
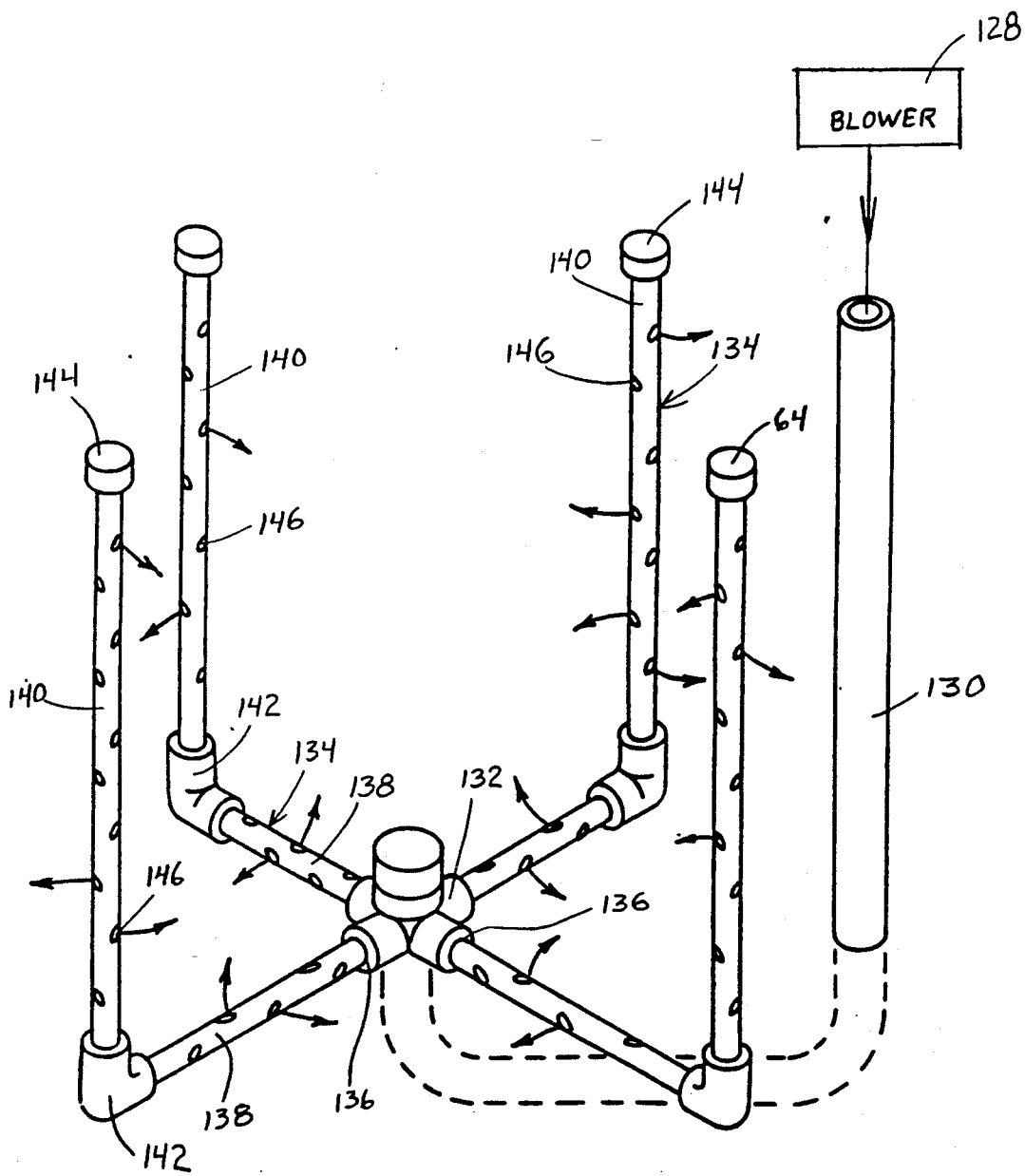
FIG. 5 is a perspective view of a portion of the air supply system of the invention.

Since the pressure organic matter of the compost material in the digester 12 consists of billions of living microorganisms, air is essential for these microorganisms to properly function. Accordingly, an airflow system must be incorporated into the digester One suitable system is illustrated in FIG. 5. An electric blower 128 situated externally of the digester 12, directs pressurized air through an air supply tube 130 which is connected to an air divider 132 situated centrally Of digester housing 12 adjacent the bottom thereof. A plurality of air supply tubes 134 are connected to the outlets 136 of air divider 132. Each tube 134 is shown as including a generally horizontal lower portion 138 and a generally upright upper portion 140 connected by appropriate fittings 142. The free ends of upper portions 140 are closed by appropriate cap 144. The air supply tubes 134 include a plurality of spaced apart perforations 146 for dispersing air into the digester housing. Those perforations may be one half inch ($\frac{1}{2}''$) holes drilled opposite one another every three inches along the tube. Half inch ($\frac{1}{2}''$) holes work best since an ample amount of air flows into the file and the holes are small enough so that compost cannot get inside the tubing. The upright upper portions 140 are preferably arranged in the far corners of the digester where the composting is most likely to become anaerobic for lack of air.

The illustrated arrangement of air supply tubes within the digester housing is preferred for directing air throughout the housing while minimizing interference with loading and unloading of compost into and from the housing. If air does not get to a compost matter within the housing, the pile will become anaerobic. Note that if the blower 128 and main air supply tube 130 originate from inside of a home or other building, it is essential to install a damper in tube 130, or cap the end when the blower is not being used, to prevent gasses from back drafting into the building. The main air supply tube 130 may be constructed of three inch (3") PVC Schedule 40 and the interior air supply tubes 134 may be constructed of two inch (2") PVC Schedule 40. The illustrated system uses a Dayton shaded pole blower 128 which provides 265 cubic feet per minute in free air.

Once one is certain that everything is properly in place and functioning, it is time to load the digester. The digester should be loaded late in the fall to make use of the freshly fallen leaves, freshly mowed grass and any garden debris which may be available. Lawn companies are happy to provide one with loads of grass clippings. It is best to try to locate clippings which have not been chemically treated. (There is much debate as to what effect chemicals may have on root crops in gardens. This debate will probably go on for years since there is no conclusive evidence as to what harmful effects chemicals may be causing to humans or the environment. If one plans to use the finished compost in a vegetable gardening environment then it is suggested not to use chemically treated lawn clippings).

The best method of loading the digester is one of layering. Begin with organic matter, such as freshly fallen leaves approximately eight inches (8") thick and then add about six inches (6") of fresh grass. If desired one can add any shredded vegetation, such as tomato vines, flower stems or any green vegetation on hand. Any heavy material, such as thick stems should be shredded or cut up prior to loading in the digester. If one does not have a mechanical shredder, run a powered lawn mower over the more rigid materials to make the material smaller. If one does not have a powered lawn mower, use a machete or some other means of chopping or scarring the tissue on plants of high cellulose composition. This is necessary since cellulose in plant structure is the most difficult to decompose.

A typical layering method may be as follows: The floor of the digester 12 is preferably a six inch (6") to eight inch (8") layer of sand 148. Place On top of a layer of brush 150 a ten (10") to twelve (12") inch layer of newly gathered leaves 152. Spread some feathermeal/bloodmeal or manure 154 on the leaves, then sprinkle some lawn and garden lime 156. Over the lime place six (6") to eight (8") inches of newly mowed grass clippings and then layer some garden soil over the grass. During each phase insure that all material is well watered. The watering of the material is very important. Do not be surprised if hundreds of gallons of water is used while filling the digester. The water one adds will cook out of the pile in the form of steam at quite a rapid rate. Don't pack the material down by walking on it. The watering and time will take care of this. As you place the leaves in the digester this is a good time to add ground up or shredded stems from any garden vegetation Leaves have a tendency to pack tightly together. The placement of this material in with the leaves will help reduce the compacting. The layers are repeated until the digester can be loaded over time as organic matter becomes available. In fact, it is better to load the digester slowly since a lot of compacting and settling of the raw materials take place; therefore the process is continuous for a couple weeks.

The reason for the lime is two-fold; it helps slow the process and helps control the odor during the first couple weeks of intense heat and release of gasses such as, methane and carbon dioxide. Many people are reluctant to build a compost pile because they are concerned about its odor. Odor exists only for a few days and occurs during the second or third week of the operation.

Composting is a natural biochemical process of decay in which small organisms such as bacteria, fungi, and worms break down organic matter into rich, dark humus. From compost comes the essential food that plants require to carry on life, life which is essential for the animal kingdom to exist. Compost contains nitrogen, potassium, phosphorous, carbon, iron, calcium, sulphur, sodium, zinc, magnesium, aluminum, copper and manganese. These elements are required in varying amounts by plants. Compost also adds billions of microorganisms and organic matter to the soil.

In today's world composting is still practiced as it has been for hundreds or even thousands of years. Although there are various ways to compost, the modern way is to layer fresh organic matter into a pile which has a tendency to build up high heat and "cook" the smell out and destroy weed seeds due to the intense heat build up.

There is nothing difficult about making compost, but certain things are essential; namely, carbon/nitrogen, air, water, warmth and time. The composting of the present invention differs from conventional composting since it is done during the winter months in an insulated wooden box, the digester 12. Unlike speed composting, a method most composters practice in summer months, the method herein slows the process for the purpose of heat extraction.

Almost any organic matter can be composted. The materials fall into two categories. "Green" materials are high in nitrogen and "dry" materials are high in carbon. Green materials include: fresh grass and leaves, weeds and flowers, vegetables and fruit trimmings, coffee grounds, other kitchen scraps (not to include meat or fat) and manure. Supermarkets and restaurants throw away phenomenal amounts of vegetables and fruit. One can usually arrange to collect the discards. Dry materials include: sawdust, dry grass, leaves, straw, hay, and shredded unprinted paper.

Although it is not necessary to add manure when starting your compost operation, manure can be added later as the pile cools which is usually between the eighth and tenth week. Manures fall into two categories: "hot" and "cold". Cold manures come from cows and goats and can be directly applied to a garden, but are not necessarily good for compost making. Hot manures come from chickens, horses, rabbits and sheep and are excellent additives to compost. One word of caution: manures should not be mixed. Manures and straw can often be had for the asking from stables and farms.

Most compost authors recommend a carbon and nitrogen ratio of 30 to 1. This is considered a high ratio and is good for fast composting. Since it is our goal to extend the composting process over the winter months, the ratio should be higher. Generally as long as a reasonable mixture of green matter is mixed with dry matter, the project will work, and eventually makes excellent humus. Although some materials are very high in nitrogen, for example hair (12-16%) and feathers (15.30%) these materials break down very slowly. The use of any chemically derived source of nitrogen, such as urea which is very high in nitrogen, is not recommended. In early research, urea was added to the pile and the pile immediately went cold. An agronomist explained that the chemical makeup of urea kills the microorganisms in the compost material causing the pile to cool.

Oxygen is essential to the compost process. Air keeps the pile aerobic and provides active microbes with air. Since the method of the invention requires that all matter be confined in a closed box, an air source must be provided. The forced air system of the invention is therefore very important. The amount of hours required to blow air into the compost mass will vary as the pile ages. My research suggests that you supply six to eight hours of air per day for the first four to five weeks and four to five hours per day, thereafter. As air is blown into the pile, the pile will cool a few degrees, but the heat will recover quite rapidly after turning off the blower.

Moisture is required to keep bacterial activity flourishing. My research shows it is necessary to add water on a regular basis since an enormous amount of steam comes from the digester; especially in the early weeks of the project. As a general rule, the material should be as moist as a wrung out sponge. The water should be added when temperatures are above freezing. A circular lawn sprinkler with a slow water flow works nicely. Punching holes in the pile prior to watering will help distribute the water evenly. The water should be concentrated more to the center of the pile since that is the hottest part of the pile and it will become quite dry and brittle after a few weeks if not watered. It is not unusual to use 1,500 to 2,000 gallons of water over a four month period. When adding water there is no general rule to follow, but you should not allow the pile to get too soggy. I have found that it is unlikely that you will add too much water.

Temperature plays an important part in the biology of making compost. Within two (2) to four (4) days the temperature inside the mass of organic material can reach as high as 77° C. (170° F.). The microbes which decompose the raw materials, basically fall into two categories: Mesophilic (those that live and grow at temperatures of 10° to 40° C. (50° to 104° F.)) and Thermophilic (those that replace the mesophilic microbes when everything in the pile is very active; the microbial activity is intense where microbes are eating microbes and the temperature at the pile's center is very hot. Since the pile is often functioning in very extreme cold temperatures, the system of the invention provides warmth to the pile by means of solar gain. Heat is trapped in the digester by glass which lines the top of the digester. It is not unusual for the temperature to be 35° C. (95° F.) under the closed glass when the outside temperature is zero on a bright sunny day. As with most natural processes, composting takes time. Since one of the goals of this project is to recover heat from the compost process, it is to one's advantage to slow the process. When the pile is unloaded from the digester it can be windrowed and continue its decomposition. Even windrowned, in an open air environment, a significant amount of heat exists within the pile. Should you decide to save your compost for fall or the following spring it should be covered and stored in a protected area. If it is kept for a long period during the summer, the finished compost should be watered and turned from time to time. Although there is disagreement as to when compost is finished, the physical characteristics for finished compost are earthy odor, dark color, fluffy structure, low specific gravity, and cool. Finished compost will improve the aeration and water holding capacity of your soil as well as add many nutrients and micronutrients.

The following example records experimental work with a compost water heater of the type shown and described herein. The temperatures from December 19th through the 23rd were as low as 32° C. (−25° F.) with wind chills at −52° C. (−60° F.) or lower. I loaded my compost pile in late October and early November and except for adding water and providing air nothing else has been done to the pile.

The outside temperatures and weather conditions were taken from local radio station reports. Water temperatures from the tanks were taken directly from water drained from the tanks using a heating and air conditioning thermometer to measure the temperature. Temperatures at the solar collector 72 and the solar heated water 28 were measured by sensor 104. The information is fed back to a digital readout display 108 and recorded.

Nov. 1, 1989, 9:00 a.m. Outside temperature=20° C. (35° F.), partly cloudy, compost heated water temperature=60° C. (140° F.). Drained forty-eight gallons of water to wash clothes.

Nov. 3, 1989, 8:30 a.m. Outside temperature=0° C. (32° F.), sunny, compost-heated water temperature=57° C. (134° F.) At this point in time, reference is made only to the temperature of the compost heated water. The compost temperature is hotter than the water flowing through the solar collector.

Dec. 19, 1989, 8:00 a.m. Outside temperature= −25° C. (13° F.) sunny, compost heated water temperature: 31° C. (88° F.). Water in solar heated tank=16° C. (60° F.). Air flow system off. Same day: 12:30 p.m., outside temperature=16° C. (3° F.), sunny, wind chill= −23° C. (−9° F.), temperature in solar collector=74° C. (166° F.). Fluid coming through collector at 32° C. (90° F.). Same day, 3:00 p.m., water temperature in solar heated tank=26° C. (78° F.). This is a gain of 9° C.(18° F.) for a thirty gallon tank of water in a five hour period (10:00 a.m. to 3:00 p.m.)

Dec. 22, 1989, 8:00 a.m. Outside temperature=32° C. (−25° F.), wind chill=44° C. (−47° F.), sunny, city water temperature =10° C. (50° F.), compost heated water temperature 50° C. (82° F.) solar heated water temperature=18° C. (64° F.), air flow off. Same day: 1:00 p.m. outside temperature=28° C. (−18° F.), wind chill=40° C. (40° F.), solar collector temperature: 74° C. (166° F.), fluid flowing through collector at 32° C.(90° F.), temperature under glass at top of compost pile=16° C.(60° F.). Same day: 2:00 p.m., solar heated water temperature=24° C. (76° F.). This is a 6° C. (12° F.) gain over a four hour period.

To put this in perspective, most people take showers at a water temperature of 42° C. (107° F.). If we use as an example spigot water temperature at 18° C. (50° F.), there is a difference of 14° C. (57° F.) which would have to be heated by an external heat source. Thus, compost and solar heat have provided you with 60 gallons of water at a temperature of approximately 27° C. (80° F.). More than 50% of your required water for bathing has been heated by natural means (i.e., compost or solar energy). What's more, the water which is heated by compost has gained heat since there is very little or no loss to the outside temperatures as you would have with stored heat in a conventional water tank. On December 28, I check the pile and found it to be very dry and it had cooled to 26° C. (78° F.). At this time, approximately three hundred pounds of fresh turkey manure was added and 250–300 gallons of water and then piled the material to the center of the pile. The pile had decreased in size approximately 20 percent, therefore, it was necessary to turn some of the organic matter by hand. Since I was adding fresh manure and water, I scraped material from the center area to the sides and added the manure and water. To get the water to the lower part of the pile, I use an iron rod with a sharp point to make holes in many sections of the pile. With the holes in the pile, the manure and water flows easily down through the pile. Because of the large amount of cold water used to moisten the organic matter, the pile cooled. Within three days the pile was over 38° C. (100° F.) and the compost water temperature was 39° C. (102° F.).

Feb. 15, 1990. After six weeks of above normal temperatures, another cold spell has moved in with snow. The outside temperature at 8:00 a.m. was −7° C. (20° F.). The compost heated water is 25° C. (77° F.). On Jan. 23 and Feb. 8, 1990, I added more fresh turkey manure and water. With each manure addition the compost heated water gained approximately 60° C. (12° F.)

My goal was to preheat city water to an average temperature of 24° C.(75° F.) through the use of solar/compost heat. From the period Nov. 1, 1989 to Feb. 15, 1990, the average temperature coming through the compost heated tank had been 34.1° C. (95.3° F.). Of course, this figure will vary around different parts of the world because of the large variation of outside climate temperatures and the amount of sun available.

The compost water heater of the invention has been advantageously used for three functions, namely to make compost, extract heat and start seedlings for gardening.

For use of the compost water heater as a hotbed, the solar collector is removed from the front of the digester for emptying the partially finished compost to a site where it can be windrowed. If the pile has been aired and watered properly, the material will be moist. There will be some odor, but it should not be offensive. The odor will quickly disappear when the material is windrowed.

Once the digester is emptied you should lay a heat cable, such as those readily available in hardware stores used to keep water pipes from freezing, over the remaining compost and brush. Once spread out in an even fashion, place three to four inches of garden soil over the cable. With the soil in place, seeds can be scattered over the soil and layered with a thin layer of soil. Dampen the soil and in a few weeks you will have hundred of seedlings growing.

Whereas the invention has been described in connection with a preferred embodiment thereof, it is understood that many modifications, additions and substitutions may be made which are within the intended broad scope of the appended claims.

I claim

1. A compost water heater, comprising,
    a digester housing adapted to be filled with layers of fresh organic mater,
    a compost heated water tank in said housing,
    means for filling said compost heated water tank with water,
    means for drawing heated water from said tank,
    an air supply conduit means arranged in said digester and operative to disperse air at spaced apart positions throughout said digester,
    means for connecting said air supply conduit means to a source of forced air whereby, upon filling said digester with fresh moist organic matter at least to a level to substantially cover said compost heater water tank and upon filling said water tank and connecting said air supply conduit means to a source of forced air, organic matter in the digester is composted, producing heat which warms the water in said compost heated water tank,
    a solar heated water tank adapted to be buried in the ground adjacent said digester housing, said solar heated water tank including inlet means adapted for connection to a source of water and an outlet means connected to said means for filling said compost heated tank with water,
    a solar heater including a solar collector, a heat exchanger, pump means and pipe means interconnecting said solar collector, heat exchanger and pump means, a heat exchange fluid within said solar collector, heat exchanger, pump means and pipe means for circulation therethrough by said pump means, and
    said heat exchanger contacting said solar heated water tank for direct thermal conduction of heat between the solar heated heat exchanger and the solar heated water tank such that there is no fluid flow therebetween.

2. The compost water heater of claim 1 wherein said digester includes opposite front and back walls, opposite side walls and a top wall, said top wall including glazing through which sunlight may warm organic matter within the digester.

3. The compost water heater of claim 1 wherein said compost heated water tank is generally centrally positioned within said digester housing.

4. The compost water heater of claim 1 wherein said first fill tank is buried in the ground beneath said digester housing.

5. The compost water heater of claim 1 wherein said solar collector comprises one wall of said digester housing.

6. The compost water heater of claim 1 wherein said solar heated water tank is buried in the ground beneath said digester housing.

7. The compost water heater of claim 1 further comprising a compost heated water drain valve operatively associated with said means for drawing water from said compost heated water tank for draining water from said compost heated water tank.

8. The compost water heater of claim 7 further comprising a solar heated water drain valve operatively associated with said solar heated water tank for draining water therefrom.

9. The compost water heater of claim 8 further comprising a first drain valve operatively associated with said first fill tank for draining water therefrom.

10. The compost water heater of claim 1 wherein said air supply conduit means includes an air supply tube adapted for connection to a source of pressurized air, an air divider having an inlet connected to said air supply tube and a plurality of outlets, and a plurality of air supply tubes connected to respective outlets and extended within said digester housing for dispersing air therein.

11. The compost water heater of claim 10 wherein each air supply tube comprises a generally horizontal lower portion extending outwardly from said divider and a generally upright upper portion extending upwardly from said lower portion, both portions including a plurality of spaced apart perforations for dispersing air therefrom into the digester housing.

12. The compost water heater of claim 1 wherein said digester housing is supported on the ground and wherein said digester housing has an open bottom whereby compost within said housing is supported on the ground.

13. A method of heating water by composting, comprising, providing a digester housing, a compost heated water tank in said digester housing, an air supply conduit extended within said digester housing, a solar heated water tank including inlet means and outlet means, a solar heated including a solar collector, a heat exchanger, pump means and pipe means interconnecting said solar collector, heat exchanger and pump means, and a heat exchange fluid within said solar collector, heat exchanger, pump means and pipe means for circulation therethrough by said pump means, burying said solar heated water tank adjacent said digester housing, connecting said inlet means of said solar heated water tank to a source of water, connecting said outlet means of said solar heated water tank to said compost heated water tank and thereby at least partially filling said compost heated water tank with water, positioning said solar collector for exposure to the sun, placing said heat exchanger in contact with said solar heated water tank for direct thermal conduction of heat between said solar heated heat exchanger and said solar heated water tank such that there is no fluid flow therebetween, at least partially filling said digester housing with moist organic matter to substantially cover said compost heated water tank, connecting said air supply conduit to a source of pressurized air, thereby dispersing air throughout the compost in said digester housing, allowing time for said organic material to be composted, thereby generating heat and warming the water in said compost heated water tank.

14. The method of claim 13 further comprising drawing heated water from said compost heated water tank.

* * * * *